3,543,040
THEFT-PROOFING IGNITION LOCK FOR
AUTOMOBILES
Nicholas C. Nemeth, 7324 Beverly,
Overland Park, Kans. 66204
Filed Jan. 10, 1969, Ser. No. 790,411
Int. Cl. H02g 3/00
U.S. Cl. 307—10                                      8 Claims

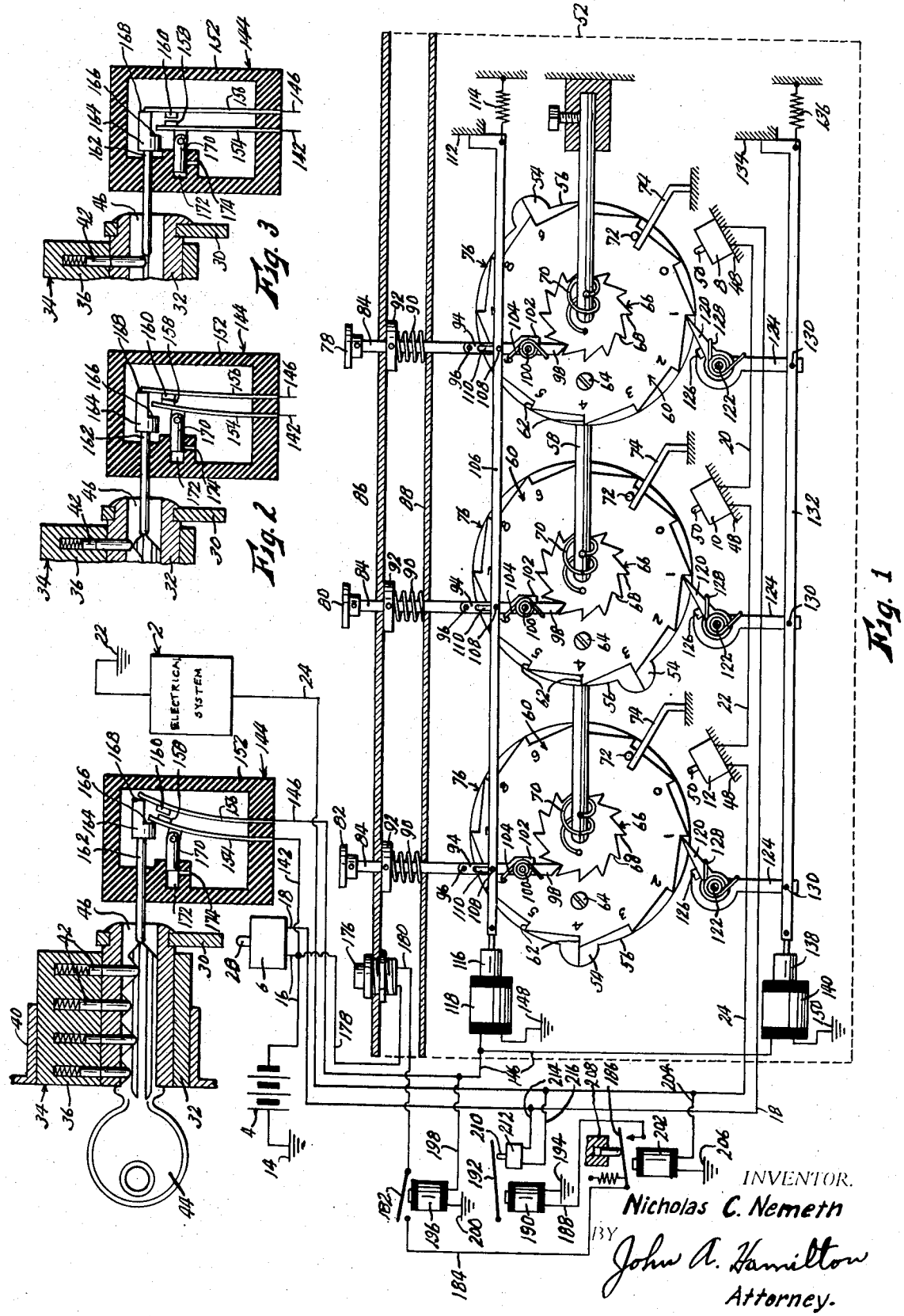

ABSTRACT OF THE DISCLOSURE

In an automotive vehicle having an ignition circuit rendered operable by the closing of an ignition switch operable by a key lock, the combination of a plurality of normally open electric safety switches connected in series in said ignition circuit, means responsive to a coded number of operations of a push button to close each of said safety switches, electrically operable means for opening all of said safety switches and means operable by the withdrawal of the key from said ignition switch lock to energize said switch opening means.

---

This invention relates to new and useful improvements in theft-proofing devices for automotive vehicles, and has particular reference to a new and novel ignition locking system.

The principal object of the present invention is the provision of an ignition locking system which, to render the ignition system operable, requires not only the use of the usual ignition lock key, but also the pressing of a series of push buttons according to a coded number, the code number being known only to the owner of the vehicle, or to other authorized persons. The push buttons function, when properly operated, to close a plurality of safety switches disposed in series in the ignition circuit. Thus the vehicle cannot be set in operation by a thief who has stolen the owner's keys, or who is equipped with a set of so-called "master" keys, or by anyone who does not know the code number to be impressed on the push buttons.

Another object is the provision of a device of the character described having means operable by withdrawal of the ignition key to open all of said safety switches, so that operation of the push buttons is required to again re-energize the ignition system of the vehicle. Thus the owner cannot leave his car on any occasion he would take his keys with him, leaving the code number pressed into the push buttons by accident, while at the same time he may if necessary leave the key in the car, as at a parking station, with no necessity of informing the attendant of the code number.

Other objects are simplicity and economy of construction, efficiency and dependability of operation, and adaptability for application as an attachment to pre-existing vehicles.

With these objects in view, as well as other objects which will appear in the course of the specification, reference will be had to the accompanying drawing, wherein:

FIG. 1 is a partially schematic diagram of a theft-proofing ignition locking system for automotive vehicles, embodying the present invention, with the ignition key inserted, FIG. 2 is a fragmentary view similar to FIG. 1 but showing the position of the trip switch as the ignition key is withdrawn, and FIG. 3 is a view similar to FIG. 2 but showing the position of the trip switch after the ignition key is withdrawn.

Like reference numerals apply to similar parts throughout the several views, and the numeral 2 applies to the electrical system of an automotive vehicle. Said electrical system includes the ignition system of the vehicle, and the circuit energizing said system will hereinafter for convenience be referred to as the ignition circuit. The theft-proofing system forming the subject matter of the present invention is designed to control the ignition circuit, although it could equally well control any other electrical circuit necessary to the operation of the vehicle, such as the starter circuit. The ignition system is furnished with electric power from a battery 4 through an ignition switch 6. According to the present invention, a number (three as shown) of safety switches 8, 10 and 12 are connected in series with switch 6. One terminal of battery 4 is grounded at 14, and the ignition circuit may be traced from the opposite terminal of said battery through wire 16, switch 6, wire 18, switch 8, wire 20, switch 10, wire 22, switch 12, wire 24 and electrical system 2 to ground at 26. This circuit must of course be complete for the vehicle to operate.

Ignition switch 6 is normally open, but is adapted to be closed by the depression of an operating plunger 28 thereof by a finger 30 fixed to the tumbler 32, of a pin tumbler lock 34, said finger engaging said plunger when said tumbler is rotated in a barrel 36 fixed in a frame 40. A series of split pins 42 extend radially in said tumbler and barrel, and cooperate with a key 44 inserted in the key slot 46 of the tumbler to permit rotation of said tumbler only when the proper key is used, in a manner well known in the art.

Safety switches 8, 10, and 12 are mounted on rigid supports 48, and each is of a normally open type, being closable by depression of an operating plunger 50 thereof. Said switches are mounted in a switch housing indicated at 52, which should be made as tamper-proof as possible by any suitable means, not shown and which may be mounted in a vehicle at any position conveniently accessible to the driver. Each of switches 8, 10 and 12 is closable by a lobe 54 of a disc 56 mounted rotatably and concentrically on a fixed shaft 58 mounted in housing 52. Each disc 56 is angularly adjustable relative to a ratchet wheel 60 having teeth 62 at regularly spaced intervals about the periphery thereof, said ratchet wheel also being rotatable on shaft 58, and being fixable relative to disc 56 by means of a set screw 64. A second ratchet wheel 66 is fixed concentrically to wheel 60, and has teeth 68 equal in number to teeth 62 of wheel 60. Each combination of disc 56 and wheels 60 and 66, which combination may be termed a "rotor" and is designated generally by the numeral 76, is biased rotatably in a clockwise direction on shaft 58, as viewed in FIG. 1, by a clock spring 70 having its ends secured respectively to said shaft and to wheel 66, this clockwise rotation being limited by the engagement of a pin 72 fixed in the face of wheel 60 with a rigid stop 74 fixed in housing 52.

The rotors 76 are turned in a counter-clockwise direction on shaft 58, whereby to close switches 8, 10 and 12, respectively by push buttons 78, 80 and 82 disposed exteriorly of housing 52. Each push button is affixed to a spindle 84 extending into said housing through top wall 86 thereof and through an interior partition wall 88 thereof. A spring 90 disposed about said spindle and compressed between wall 88 and a collar 92 fixed on said spindle serves to bias the push button outwardly. A link 94 is pivoted at one end to the inner end of spindle 84, as at 96, and a pawl 98 is pivoted to the opposite end of said link, as at 100. Said pawl engages a tooth 68 of ratchet wheel 66, and is normally held in alignment with link 94, or against a stop shoulder 102 of said link, by a spring 104 connecting said link and pawl, though said pawl can be pivoted relative to said link to disengage teeth 68 by yielding of said spring.

Links 94 are all connected by a bar 106 each by a pivot pin 108, extending transversely to said links. Each pivot pin 108 engages a longitudinal slot 110 of its associated link, so as not to interfere with the individual operation of push buttons 78, 80 and 82. Bar 106 is biased to the right, as viewed, against a fixed stop 112 of housing 52, by a spring 114, whereby to position links 94 to hold pawls 98 in engagement with ratchet wheels 66. Spring 114 must be stronger than springs 104. Bar 106 is attached to the armature 116 of a solenoid coil 118 mounted in housing 52, so that whenever said coil is energized, links 94 are pivoted to move pawls 98 out of engagement with wheels 66. Thus each time push button 78, 80, or 82 is pressed once, its corresponding rotor 76 is turned in a counterclockwise direction to a degree equal to the angular interval between a successive pair of teeth 68 of wheel 66.

Each time a rotor 76 is turned as just described, it is engaged and held by a dog 120 pivoted on a fixed pivot 122 carried by housing 52. Also pivoted at 52 is a lever 124 having a stop 126 against which dog 120 is biased by a spring 128 interconnecting said lever and dog. The free end of each of levers 124 is pivoted, as at 130, to a bar 132 extending transversely thereto. Said bar is urged against a fixed stop 134 carried by housing 52 by a spring 136 stronger than springs 128 to hold dogs 120 in a position to engage teeth 62 of ratchet wheels 60, though each dog can pivot independently of its lever 124 to disengage wheel 60, by the yielding of its spring 128. Bar 132 is connected also to the armature 138 of a solenoid coil 140 mounted in housing 52, so that each time coil 140 is energized, it pivots levers 124 to disengage all of dogs 120 from wheels 60.

By loosening set screws 64, the lobe 54 of disc 56 of each rotor 76 may be aligned with any of the teeth 62 of said rotor, and the push button of that rotor must then be pressed a number of times equal to the number of that tooth to cause said lobe to engage the plunger 50 of its corresponding switch 8, 10 or 12 to close said switch. For example, as shown, the device is set for the code number 439, so that push button 82 must be pressed four times to close switch 12, push button 80 pressed three times to close switch 10, and push button 78 pressed nine times to close switch 8. Presuming that key 44 has been inserted and turned to close ignition switch 6, the previously described ignition circuit is complete and the vehicle engine can be started. However, it should be noted that mere possession of the proper key 44 is not sufficient to start the vehicle, and that the user must also know the code number and impress it on the push buttons. Thus the vehicle cannot be stolen by a thief with a set of "master" keys capable of operating any ignition lock. The code number is of course known only to the vehicle owner, and to such persons as the owner may choose to authorize. Furthermore, the code number may be changed at any time by loosening set screws 64. The number of different code numbers available is equal to the number of stations available on each rotor, raised to the power equal to the number of rotors. For example with eleven stations on each of three rotors, as shown, 1331 different code numbers are possible, and this may be further multiplied by using more rotors, or more stations on each rotor.

To render it unlikely that the driver would accidentally leave his vehicle with the code number impressed on push buttons 78, 80 and 82, there is provided a trip circuit from battery 4 through wires 16 and 142, a normally open trip switch 144 and wire 146 to solenoid coils 118 and 140, the opposite terminals of said coils being grounded respectively at 148 and 150. As diagrammed, switch 144 includes a housing 152 adapted to be mounted closely adjacent ignition lock 34, and has a pair of resilient switch arms 154 and 156 mounted therein, said switch arms being connected respectively to wires 142 and 146, and having cooperating contacts 158 and 160 adjacent their free ends. When the switch arms are relaxed, as in FIG. 3, contacts 158 and 160 do not engage. Said switch is provided with an operating plunger 162 extending slidably through housing 152, and lying in the plane of resilient movement of arms 154 and 156, and disposed transversely to said arms. At its inner end, said plunger is provided with a head 164 of insulating material having a pair of shoulders 166 and 168 adapted respectively to engage and deflect arms 154 and 156 when the plunger is pressed inwardly. Pivoted to the switch bar closest to the exit of plunger 162 (arm 154 as shown) is a small piston 170 extending parallel to said plunger into a dashpot chamber 172 formed in housing 152, having a snug sliding fit therein. Switch housing 152 is so mounted that the outer end of plunger 162 extends longitudinally into key slot 46 of ignition lock 34, from the rearward end thereof, so as to be engaged and depressed by key 44 as the latter is inserted. Most vehicle ignition locks are either already open at the rearward end, or can easily be bored to receive plunger 162.

As previously mentioned, when key 44 is not in the lock as in FIG. 3, contacts 158 and 160 are open. Also, when the key is inserted, shoulders 166 and 168 are so spaced that while arms 154 and 156 are deflected thereby, as in FIG. 1, contacts 158 and 160 remain open. During insertion of the key, piston 170 moves outwardly in dashpot 172, and the vacuum therein is relieved by vent 174. As key 44 is withdrawn (see FIG. 3), shoulder 166 releases arm 154, but the resilient recovery of said arm is slowed by the dashpot, piston 170 covering vent 174 and building up air pressure in chamber 172. Arm 156, having no dashpot, recovers more rapidly and allows contacts 158 and 160 to move into engagement, completing the previously described trip circuit. Solenoid coils 118 and 140, thus energized, retract bars 106 and 132 to move pawls 98 and dogs 120 out of engagement with the ratchet wheels, so that rotors 76 are returned by springs 70 to their starting positions with pins 72 against stops 74. After a short time during which air leaks from dashpot chamber 172 around piston 170, switch 144 again opens, but only a momentary closure of the trip circuit is necessary for the function described. Thus the driver cannot remove ignition key 44 without another impression of the code number on the push buttons becoming necessary. On the other hand, if for example when leaving the vehicle at a parking station with the ignition key in the lock, the vehicle may be started and stopped by the station attendant as often as may be desired, with no reference to the push buttons.

As a convenience, to allow deactivation of the safety system whenever desired or necessary, as for example when the owner must permit use of the vehicle by other persons, there is provided a setting circuit from battery 4 through wires 16 and 178, a normally open push button switch 176, wire 180, the pole circuit of a normally open relay 182, wire 184, the pole circuit of a normally open relay 186, wire 188, and the coil 190 of a switch operating relay 192 to ground at 194. Relay 182 is operable to be closed whenever its coil 196 is energized, one terminal of said coil being connected by wire 198 to wire 146, and its opposite terminal being grounded at 200. Thus relay 182 is closed whenever solenoid coils 118 and 140 are energized. Relay 186 is closed whenever its coil 202 is energized, one terminal of said coil being connected by wire 204 to wire 24, and its other terminal being grounded at 206. Thus relay 186 is closed whenever switches 6, 8, 10 and 12 of the ignition circuit are all closed. Whenever the circuit to coil 202 is interrupted, the opening of relay 186 is delayed by a dashpot arrangement 208. Relay 192 is operable, each time its coil 190 is energized, to press the operating plunger 210 of a snap switch 212. It will be understood that switch 212 is of a type operable to be alternately opened and closed by successive pressings of its plunger. The poles of said switch are connected respectively to wires 18 and 24 of the ignition circuit by wires 214 and 216, so that when closed it bypasses safety switches 8, 10 and 12.

With the exception of the setting circuit, the operation of the safety system is considered to have been fully described in connection with the description of its construction. That is, so long as setting switch 212 is open, the ignition circuit cannot be closed, and hence the vehicle cannot be operated, until the proper ignition key 44 is inserted and turned to close ignition switch 6, and until the push buttons 78, 80 and 82 have each been pressed the predetermined coded number of times to close safety switches 8, 10 and 12. Further, whenever key 44 is withdrawn, as previously described, trip switch 144 is momentarily closed to complete an operating circuit to solenoid coils 118 and 140, allowing rotors 76 to be returned to their neutral starting positions by spring 70, so that the vehicle will not accidentally be left with the code number impressed on the push buttons.

To deactivate the safety system, the operator, with the ignition circuit completed as just described, first presses push button 176, then turns key 44 to its "off" position and immediately withdraws it from the lock. As long as the normal ignition circuit is closed, current is furnished to coil 202 through wire 204, so that relay 186 remains closed. Turning key 44 to its "off" position of course opens the ignition circuit and interrupts current to coil 202, but the opening of relay 186 is delayed for a short time by dashpot 208. During this time delay, key 44 is withdrawn, causing a momentary closure of switch 144 to complete the trip circuit to solenoid coils 118 and 140, and also coil 196, causing relay 182 to close. Dashpot 208 must of course delay the opening of relay 186 for a sufficient time that it is still closed when relay 182 closes. Thus, assuming that push button switch 176 is being manually held closed at this time, the setting circuit to relay coil 190 is completed momentarily, causing relay armature 192 to engage and depress plunger 210 of switch 212 to close said switch. The closure of switch 212 by-passes safety switches 8, 10 and 12, allowing the ignition circuit to be completed from battery 4 through wire 16, ignition switch 6, wires 18 and 214, switch 212, and wires 216 and 24 to electrical system 2. Thereafter, the vehicle can be started, stopped and operated subject only to the usual control of ignition key 44, the safety system being inoperative.

While the safety system can be deactivated as just described, this is not considered to be self-defeating to its basic function of theft prevention, since the deactivation can be performed only by a person possessing the proper ignition key 44, as well as knowledge of the code number to be impressed on push buttons 78, 80 and 82, and special knowledge as to when push button 176 should be pressed. As a further precaution, push button 176 may be disposed in a separate, secret location remote from housing 52. The entire setting circuit could of course be discarded if considered to be dangerous or self-defeating to the basic purposes of the system. The system, once deactivated as described, can be reactivated more simply at any time by inserting and turning key 44 to close switch 6, completing a circuit to coil 202 from switch 212 (then closed) through wires 216, 24 and 204 to close relay 186 without requiring operation of push buttons 78, 80 and 82, and pressing push button 176 while turning and withdrawing key 44. This completes the setting circuit in the manner already discussed to cause operation of relay 192 to open switch 212. Then, upon reinsertion of key 44, the safety system is fully operative. This reactivation is extremely unlikely to occur by accident, which could be extremely inconvenient, if not actually dangerous, to drivers not knowing the code number, or not familiar with the safety system.

While I have shown and described a specific embodiment of my invention, it will be readily apparent that many minor changes of structure and operation could be made without departing from the spirit of the invention.

What I claim as new and desire to protect by Letters Patent is:

1. In an automotive vehicle having a basic operative electrical circuit the completion of which is essential to the operation of said vehicle, a theft-proofing system comprising:
   (a) a plurality of normally open safety switches connected in series in said circuit,
   (b) operating means for each of said safety switches including a manually movable member and means operable by a predetermined number of movements of said member to close the associated safety switch, and
   (c) release means operable responsively to a predetermined impulse to open all of said safety switches, whereby the predetermined number of movements of each of said operating members is again required to close said safety switches.

2. The system as recited in claim 1 wherein said operating means for each of said safety switch comprises:
   (a) a rotatably mounted rotor having a lobe operable at one angular position of said rotor to close the assciated safety switch, said rotor including a notched ratchet wheel,
   (b) resilient means biasing said rotor rotatably toward a neutral starting position,
   (c) pawl means operable by a manual push button to turn said rotor in the opposite direction through a predetermined angular degree in response to each pressing of said push button, by interaction with said ratchet wheel, and
   (d) dog means operable to secure said rotor in its advanced position after it has been advanced by said pawl means.

3. The system as recited in claim 2 wherein said release means comprises means responsive to said predetermined impulse to render all of said pawl and dog means inoperative.

4. The system as recited in claim 1 wherein said basic operative circuit includes, in series with said safety switches, an ignition switch closable by the insertion and turning of a key in a key lock, and with the addition of means operable by the withdrawal of said key from said lock to activate said release means, whereby the withdrawal of said key from said lock constitutes the impulse activating said release means.

5. The system as recited in claim 4 wherein said release means is electrically operable, and is provided with an operative trip circuit including a source of electric power, said release means, and a trip switch having an operating plunger mechanically movable by the insertion of said key in said lock, said trip switch being operable to, close in response to the withdrawal of said key from said lock.

6. The system as recited in claim 5 wherein said trip switch is operable to remain open as said key is inserted in said lock, and to close momentarily and then reopen as said key is withdrawn from said lock.

7. The system as recited in claim 1 with the addition of:
   (a) a setting switch connected in conductors by-passing said safety switches in said basic operative circuit, and
   (b) means operable responsively to predetermined impulses to selectively open or close said setting switch, whereby to render said safety switches respectively operative or inoperative to control said basic operative circuit.

8. The system as recited in claim 6 with the addition of:
   (a) a setting switch connected in conductors by-passing said safety switches in said basic operative circuit,
   (b) electrically actuated means for operating said setting switch, operable to alternately open and close said setting switch on successive actuations thereof,
(c) a first normally open relay,
(d) electrically actuated operating means for closing said first relay, said operating means having an operative circuit including a source of electric power and said trip switch,
(e) a second normally open relay,
(f) electrically actuated operating means operable when energized to close said second relay, said operating means having an operative circuit including a source of electric power, said ignition switch and said safety switches, and being closable independently of said safety switches by said setting switch when the latter is closed,
(g) means operable to delay the opening of said second relay for a short time after its operating means is deenergized,
(h) a normally open, manually operable switch, and
(i) a setting circuit including a source of electric power, said manually operable switch, said first relay, said second relay, and the operating means of said setting switch.

References Cited
UNITED STATES PATENTS

| | | | |
|---|---|---|---|
| 1,442,487 | 1/1923 | Lucier | 307—10 |
| 1,520,678 | 12/1924 | Vorndieke | 200—43 |
| 2,650,989 | 9/1953 | Heath | 307—10 |
| 2,909,711 | 10/1959 | Neville et al. | 317—134 |

ROBERT K. SCHAEFER, Primary Examiner

H. J. HOHAUSER, Assistant Examiner

U.S. Cl. X.R.

180—114; 317—134; 340—64